(12) United States Patent
Ojima et al.

(10) Patent No.: US 9,383,271 B2
(45) Date of Patent: Jul. 5, 2016

(54) LOAD DETECTION DEVICE

(71) Applicant: AISIN SEIKI KABUSHIKI KAISHA, Kariya-shi, Aichi (JP)

(72) Inventors: Yasukuni Ojima, Kariya (JP); Naoya Iesato, Kariya (JP)

(73) Assignee: AISIN SEIKI KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/394,604

(22) PCT Filed: May 22, 2013

(86) PCT No.: PCT/JP2013/064251
§ 371 (c)(1),
(2) Date: Oct. 15, 2014

(87) PCT Pub. No.: WO2013/179988
PCT Pub. Date: Dec. 5, 2013

(65) Prior Publication Data
US 2015/0068324 A1     Mar. 12, 2015

(30) Foreign Application Priority Data

May 31, 2012  (JP) .................................. 2012-125319
Nov. 20, 2012 (JP) .................................. 2012-254433

(51) Int. Cl.
*G01L 1/04*       (2006.01)
*G01L 1/22*       (2006.01)
(Continued)

(52) U.S. Cl.
CPC ................. *G01L 1/22* (2013.01); *G01L 1/2231* (2013.01); *G01L 5/161* (2013.01); *G01L 5/223* (2013.01); *G01L 9/0044* (2013.01); *G01L 9/0051* (2013.01); *G01L 9/0055* (2013.01)

(58) Field of Classification Search
CPC ....... G01L 1/2231; G01L 1/04; G01L 9/0051; G01L 9/0055; G01L 9/0044; G01L 5/161; G01L 5/223
USPC .............. 73/727, 862.474, 862.632, 862.045, 73/862.044, 862.382, 862.627
See application file for complete search history.

(56) References Cited

U.S. PATENT DOCUMENTS 6,912,920 B2 *  7/2005  Fortune .................. B60N 2/002
                                         73/862.044
7,210,362 B2 *  5/2007  Tsutaya .................... G01G 3/14
                                         73/862.627

(Continued)

FOREIGN PATENT DOCUMENTS

JP          5-67334 U      9/1993
JP          7-41437 U      7/1995

(Continued)

OTHER PUBLICATIONS

International Search Report for PCT/JP2013/064251 dated Jun. 18, 2013.

(Continued)

*Primary Examiner* — Lisa Caputo
*Assistant Examiner* — Jonathan Dunlap
(74) *Attorney, Agent, or Firm* — Sughrue Mion, PLLC

(57) ABSTRACT

A highly sensitive load detection device includes a tubular peripheral wall portion; a disk-shaped disk portion that has a through hole formed coaxially with the peripheral wall portion and that is supported on an inner surface of the peripheral wall portion with a gap between the disk portion and a placement surface on which the peripheral wall portion is placed; a load input portion that is formed in a spherical shape having a diameter larger than an inside diameter of the through hole on at least a side thereof facing the through hole, that is placed on the through hole, and to which a load of an object to be detected is input; and sensors that are provided on the disk portion so as to be point-symmetric about the through hole, and that detect a strain corresponding to the load input to the load input portion.

10 Claims, 9 Drawing Sheets

(51) Int. Cl.
*G01L 5/22* (2006.01)
*G01L 9/00* (2006.01)
*G01L 5/16* (2006.01)

(56) References Cited

U.S. PATENT DOCUMENTS

| | | | | |
|---|---|---|---|---|
| 8,256,306 B1 * | 9/2012 | Bauer | ................... | G01L 1/2231 |
| | | | | 73/862.474 |
| 8,955,393 B2 * | 2/2015 | Simons | ................ | B66F 17/003 |
| | | | | 73/862.045 |
| 2004/0083825 A1 * | 5/2004 | Tsutaya | .................. | G01G 3/14 |
| | | | | 73/862.474 |
| 2011/0067502 A1 * | 3/2011 | Simons | ................ | B66F 17/003 |
| | | | | 73/862.045 |
| 2011/0239763 A1 * | 10/2011 | Shkel | .................... | B29C 44/022 |
| | | | | 73/504.13 |
| 2013/0247689 A1 * | 9/2013 | Thanigachalam | .... | G01L 9/0054 |
| | | | | 73/862.627 |

FOREIGN PATENT DOCUMENTS

| | | | |
|---|---|---|---|
| JP | 2000-346723 | A | 12/2000 |
| JP | 2004-156938 | A | 6/2004 |
| JP | 2006-194709 | A | 7/2006 |

OTHER PUBLICATIONS

Written Opinion for PCT/JP2013/064251 dated Jun. 18, 2013.
English Translation of International Preliminary Report on Patentability for PCT/JP2013/064251 dated Dec. 11, 2014.

* cited by examiner

LOAD DETECTION DEVICE

CROSS REFERENCE TO RELATED APPLICATIONS

This application is a National Stage of International Application No. PCT/JP2013/064251 filed May 22, 2013, claiming priority based on Japanese Patent Application No. 2012-125319, filed May 31, 2012 and Japanese Patent Application No. 2012-254433, filed Nov. 20, 2012, the contents of all of which are incorporated herein by reference in their entirety.

TECHNICAL FIELD

The present invention relates to a load detection device that detects a load input to various devices included in a vehicle, for example.

BACKGROUND ART

Conventional techniques relating to such a load detection device include the techniques described in Patent Documents 1 and 2 cited below.

The diaphragm-type load detection sensor described in Patent Document 1 includes a fixed portion that is attached to an installation portion, a strain generating portion that includes, at the center of the fixed portion, a protruding weighted portion to which a load of an object to be detected is applied, and a strain gauge provided to the strain generating portion. The strain gauge is provided around substantially the entire circumference of the strain generating portion with a certain distance from the central axis of the weighted portion, and the fixed portion is fastened to the installation portion by using fixing screws.

The load sensor described in Patent Document 2 includes a base that has a hole at its center, that is deformed in response to a strain and on which a strain detection element is placed, and a sphere that is supported by the base and that serves as a load input portion.

PRIOR ART DOCUMENTS

Patent Documents

Patent Document 1: JP 2004-156938A
Patent Document 2: JP 2006-194709A

DISCLOSURE OF THE INVENTION

Problem to be Solved by the Invention

With the technique described in Patent Document 1, the protruding weighted portion is formed at the central part of the strain generating portion, and therefore, a stress is concentrated at the weighted portion. When a load is applied, the tensile strain generated near the weighted portion is greater than the compressive strain generated in a part of the strain generating portion on the radially outer side. Consequently, the magnitudes of the tensile strain and the compressive strain that are generated in the strain generating portion become unbalanced, making it difficult to achieve high sensitivity.

In addition, with the technique described in Patent Document 2, the base on which the strain detection element is installed is directly installed on a placement surface. Therefore, only compressive force acts on the base. When the load input to the sphere is small, the strain detection element is difficult to be strained, resulting in a reduced detection sensitivity.

In view of the above-described problems, it is an object of the present invention to provide a highly sensitive load detection device.

Means for Solving Problem

A characteristic configuration of a load detection device according to the present invention for achieving the above-described object includes a tubular peripheral wall portion; a disk-shaped disk portion that has a through hole formed coaxially with the peripheral wall portion and that is supported on an inner surface of the peripheral wall portion with a gap between the disk portion and a placement surface on which the peripheral wall portion is placed; a load input portion that is formed in a spherical shape having a diameter larger than an inside diameter of the through hole on at least a side thereof facing the through hole, that is placed on the through hole, and to which a load of an object to be detected is input; and sensors that are provided on the disk portion so as to be point-symmetric about the through hole, and that detect a strain corresponding to the load input to the load input portion.

With this characteristic configuration, the disk portion can be elevated from the placement surface, and it is therefore possible to facilitate the straining of the disk portion in accordance with the load input to the load input portion. Accordingly, it is possible to suppress the load input to the load input portion from being damped, while transmitting the load to the sensors provided in the disk portion, thus increasing the detection sensitivity. In addition, since the sensors are provided point-symmetrically about the through hole, it is possible to detect a load input to the load input portion regardless of the direction of the load.

It is preferable that the sensors include a first group of sensors uniformly arranged around the through hole in a circumferential direction such that a sensitive direction thereof extends along the circumferential direction and a second group of sensors uniformly arranged around the through hole in the circumferential direction such that a sensitive direction thereof extends along a radial direction, and the first group of sensors are provided radially inward of the second group of sensors.

Here, the sensitive direction of a sensor is a detection direction in which the sensor can detect a load, and is determined by the structure of the sensor. When a load is input to the load input portion, a strain is generated in the circumferential direction in a part of the disk portion on the radially central side, and a strain is generated in the radial direction in a part thereof on the radially outer side. Accordingly, with the above-described configuration, it is possible to facilitate the detection of the circumferential strain by the first group of sensors, and the detection of the radial strain by the second group of sensors. Therefore, the first group of sensors and the second group of sensors facilitate the detection of strains generated in each of the above-described parts, thus making it possible to increase the detection sensitivity.

It is preferable that the disk portion includes an outer ring portion located on a radially outer side thereof and an inner ring portion located on a radially inner side of the outer ring portion, and the inner ring portion is formed such that a thickness thereof decreases toward the radially inner side.

With this configuration, it is possible to facilitate the straining of the disk portion by the load input to the load input portion. Therefore, it is possible to increase the detection sensitivity.

Preferably, the disk portion is supported on an axially central side of the peripheral wall portion.

With this configuration, the disk portion is held by a part of the peripheral wall portion that is located on the placement surface side with respect to the disk portion and a part of the peripheral wall portion that is located on the side opposite to the placement surface, so that the rigidity in the vicinity of the connecting portion between the peripheral part of the disk portion and the peripheral wall portion is especially increased. Accordingly, it is possible to ideally deform the disk portion by the load from the outside, thus increasing the detection sensitivity.

Preferably, a stopper that restricts movement of the peripheral wall portion in a direction parallel to the placement surface is attached to the placement surface.

With this configuration, it is possible to suppress the peripheral wall portion from being moved by the load input to the load input portion, and facilitate the straining of the peripheral wall portion by the load. Accordingly, it is possible to facilitate the straining of the disk portion in response to a strain of the peripheral wall portion, thus increasing the detection sensitivity.

Here, the above-described load sensor is used for detecting loads acting on various functional portions of a vehicle, for example. When the load sensor is installed on a vehicle, weight reduction and size reduction are particularly required from the view point of a reduction in fuel consumption. One conceivable way to achieve the weight reduction and the size reduction is to reduce the product height of the load detection device (achieve a low profile). Specifically, it is conceivable to form the load input portion, for example, in a semi-spherical shape, or a more thinly cut shape. However, if the load input portion is configured in a thinly cut shape, a large bending stress is applied to the load input portion depending on the magnitude of the input load (the magnitude of the load of an object to be detected) and the position at which the load is input, so that plastic deformation, fracture or the like may occur in the load input portion depending on the shape.

Therefore, it is preferable that the load input portion includes an input surface to which the load from the object to be detected is input and a curved output surface formed on a side opposite to the input surface, and the load is output from the output surface, the disk portion includes a contact portion coming into contact with a curved surface of the load input portion along a continuous circular line or a broken circular line about a center of the load input portion, the peripheral wall portion is a support member that supports the disk portion between the support member and the placement surface, and a diameter range of the input surface is set based on a diameter of the contact portion that changes in response to a deflection of the disk portion that results from input of the load.

With this configuration, the load input portion can be configured to have a low height. Accordingly, it is possible to reduce the size of the load detection device. In addition, it is possible to bring the input surface to which the load is input and the position of the contact portion close to each other when the load detection device is viewed in the axial direction. Accordingly, it is possible to reduce the bending moment acting on the load input portion when a load is input thereto, and reduce the bending stress due to the positional displacement between the load input to the load input portion and the contact portion. Therefore, it is possible to achieve a load detection portion including a load input portion having excellent endurance reliability.

Preferably, the input surface is set based on a maximum change amount along the radial direction of the contact portion that changes in response to a deflection of the disk portion that results from input of the load.

With this configuration, even if the position of the contact portion is moved by the maximum amount in response to input of the load, it is possible to set the input surface such that the input surface to which the load is input and the position of the contact portion will not be too far away from each other when the load detection device is viewed in the axial direction. Therefore, it is possible to further increase the effect of reducing the bending stress due to the load input to the load input portion.

Preferably, the input surface is set in a region that overlaps the contact portion when the load detection device is viewed along an axial direction thereof even when the diameter of the contact portion has changed as a result of a deflection of the disk portion.

With this configuration, even if the position of the contact portion is moved by the maximum amount in response to input of the load, it is possible to make the input surface to which the load is input and the position of the contact portion coincide with each other when the load detection device is viewed in the axial direction. Therefore, it is possible to further increase the effect of suppressing the bending stress resulting from input of the load.

Preferably, a ring-shaped intermediate pressing member is placed on the input surface.

With this configuration, the load can be annularly input to the input surface of the load input portion. Therefore, it is possible to make the input surface to which the load is input coincide with the position of the contact portion provided in the circumferential direction when the load detection device is viewed in the axial direction, thus making it possible to reduce the bending stress generated in the load input portion.

Preferably, at least one of a cross section, perpendicular to the circumferential direction, of a surface of the intermediate pressing member that comes into contact with the load input portion and a cross section, perpendicular to the circumferential direction, of a surface of the load input portion that comes into contact with the intermediate pressing member is a curved surface.

With this configuration as well, the area formed by the curved surface can be deformed according to the load. Accordingly, as with the contact portion whose position changes in response to input of the load, the position of the center of input of the load can also be moved, and it is therefore possible to bring the input surface to which the load is input and the position of the contact portion close to each other when the load detection device is viewed in the axial direction. Thus, it is possible to suppress the bending stress resulting from input of the load.

Preferably, a surface of the load input portion on which the intermediate pressing member is placed is a flat surface, and the cross section, perpendicular to the circumferential direction, of the surface of the intermediate pressing member that comes into contact with the load input portion is a curved surface.

With this configuration, the intermediate pressing member in contact with the load input portion can be deformed according to the load. Thus, as with the contact portion whose position changes in response to input of the load, the position of the center of input of the load can also be moved, and it is therefore possible to bring the input surface to which the load is input and the position of the contact portion close to each other when the load detection device is viewed in the axial direction. Accordingly, it is possible to suppress the bending stress resulting from input of the load.

BEST MODE FOR CARRYING OUT THE INVENTION

1. First Embodiment

In the following, a first embodiment of the present invention will be described in detail. A load detection device 100 according to the present invention has the function of detecting a load input from the outside. The load detection device 100 will be described below with reference to the drawings.

Figure 1:
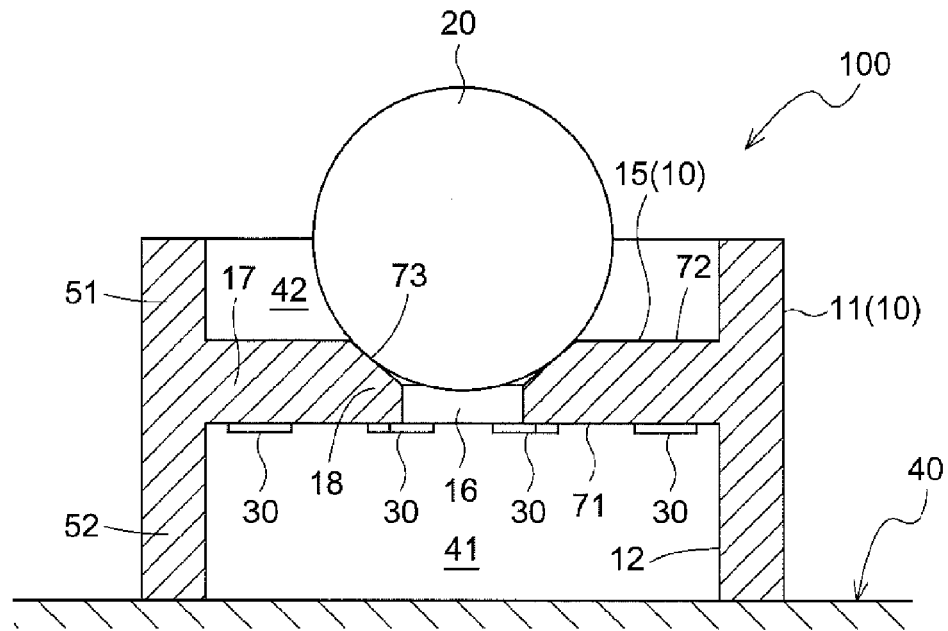
FIG. 1 is a diagram schematically showing a side cross-section of a load detection device according to a first embodiment.
Figure 2:
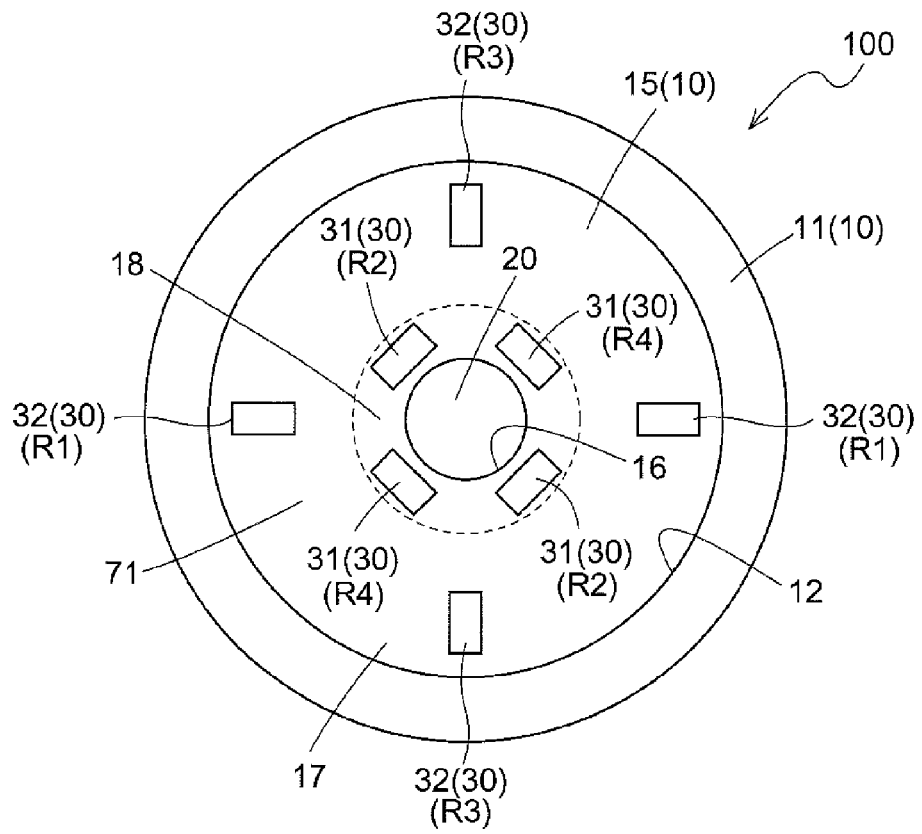
FIG. 2 is a diagram of the load detection device according to the first embodiment, as viewed from below.

FIG. 1 is a side cross-sectional view of the load detection device 100 according to the present embodiment. FIG. 2 is a schematic diagram of the load detection device 100 as viewed from below. As shown in FIG. 1, the load detection device 100 includes a strain generating member 10, a load input portion 20, and sensors 30. The strain generating member 10 includes a peripheral wall portion 11 and a disk portion 15.

The peripheral wall portion 11 has a tubular shape. In the present embodiment, the peripheral wall portion 11 is formed in a cylindrical shape. In other words, the peripheral wall portion 11 is formed in a tubular shape whose cross section orthogonal to the axial direction is circular.

The disk portion 15 is formed in a disk shape that has a through hole 16 formed coaxially with the peripheral wall portion 11 and that is supported on an inner surface 12 of the peripheral wall portion 11 with a gap between the disk portion 15 and a placement surface 40 on which the peripheral wall portion 11 is placed. In other words, the through hole 16 is formed at the center of the disk portion 15, and the through hole 16 extends through the disk portion 15 in the axial direction. Thus, the disk portion 15 is configured in the so-called toroidal shape. The disk portion 15 described above is fixed such that the outer surface of the disk portion 15 is in contact with the inner surface 12 of the peripheral wall portion 11. Although the detailed description will be given later, the fixation between the peripheral wall portion 11 and the disk portion 15 in this case is preferably performed such that the load acting on the disk portion 15 is not damped when it is transmitted to the peripheral wall portion 11.

Thus, the peripheral wall portion 11 and the disk portion 15 are preferably formed integrally using a material that is deformable upon receiving a load, including, for example, a material such as ceramics, aluminum, or stainless steel. However, the peripheral wall portion 11 and the disk portion 15 may be formed as separate members as long as the load acting on the disk portion 15 is not damped when it is transmitted to the peripheral wall portion 11.

Here, in the present embodiment, the disk portion 15 is supported on the axially central side of the peripheral wall portion 11. In other words, the disk portion 15 is supported on the inner surface 12 of the peripheral wall portion 11 so as to be spaced apart from both axial ends of the peripheral wall portion 11. Thus, the disk portion 15 is configured such that a gap is formed between the disk portion 15 and the placement surface 40 when the peripheral wall portion 11 is placed on the placement surface 40 with one axial end of the peripheral wall portion 11 as the bottom. Accordingly, when a part of the peripheral wall portion 11 that is on the side opposite to the placement surface 40 relative to the disk portion 15 is defined as a first peripheral wall portion 51, and a part of the peripheral wall portion 11 that is on the placement surface 40 side relative to the disk portion 15 is defined as a second peripheral wall portion 52, a space 41 is formed by the second peripheral wall portion 52, the disk portion 15, and the placement surface 40. On the other hand, a space 42 is formed by an axial end face of the first peripheral wall portion 51, the first peripheral wall portion 51, and the disk portion 15.

In addition, the disk portion 15 includes an outer ring portion 17 and an inner ring portion 18. As shown in FIG. 2, the outer ring portion 17 and the inner ring portion 18 are configured to be continuous in the radial direction. When the disk portion 15 is viewed in the axial direction, the part on the radially outer side corresponds to the outer ring portion 17. The radially inner side of the outer ring portion 17 corresponds to the inner ring portion 18. In the present embodiment, the outer ring portion 17 is formed so as to have a uniform thickness. On the other hand, the inner ring portion 18 is formed such that its thickness decreases toward the radially inner side. As described above, the through hole 16 is formed on the radially central part of the disk portion 15. Thus, the inner ring portion 18 is formed such that its thickness gradually decreases from the boundary with the outer ring portion 17 (in FIG. 2, the part indicated by the broken line) towards the through hole 16. In the present embodiment, when the disk portion 15 is viewed in the radial direction, the outer ring portion 17 and the inner ring portion 18 are formed such that a surface 71 of the disk portion 15 on the side facing the placement surface 40 is flat, and the disk portion 15 is formed so as to have a tapered portion 73 on the radially inner side of a surface 72 on the side opposite to the surface 71 of the disk portion 15 that faces the placement surface 40, as shown in FIG. 1.

The load input portion 20 is formed in a spherical shape having a diameter larger than an inside diameter of the through hole 16 on at least the side facing the through hole 16, and is placed on the through hole 16, and a load of the object to be detected is input thereto. As shown in FIG. 1, at least the side facing the through hole 16 is the side facing the surface 72 of the disk portion 15. The shape of the load input portion 20 on such a side is constituted by a spherical shape. Thus, in the present embodiment, the load input portion 20 is formed in a spherical shape.

The diameter of the spherical shape is configured to be larger than the inside diameter of the through hole 16. In addition, the disk portion 15 is configured to have a tapered portion 73 on the radially central side thereof. In the present embodiment, the load input portion 20 is placed on the tapered portion 73. Thus, the load input portion 20 can come into annular line contact with the tapered portion 73, without passing through the through hole 16.

As shown in FIG. 2, the sensors 30 are disposed on the disk portion 15 so as to be point-symmetric about the through hole 16 when the disk portion 15 is viewed in the axial direction. In the present embodiment, the sensors 30 are composed of known strain detection elements. Although the detailed description is omitted, a strain detection element changes its resistance value as a result of being strained according to a load input from the outside. It is possible to detect a strain based on this change in resistance value. Such sensors 30 are disposed on the surface 71 of the disk portion 15. Thereby, the disk portion 15 deforms in response to the load input to the load input portion 20, and it is possible to detect a strain caused in the sensors 30 by the deformation.

In the present embodiment, the sensors 30 are formed in an elongated shape. In other words, the sensors 30 are configured to have a rectangular shape in top view. In addition, a plurality of sensors 30 are provided in the present embodiment, and the sensors 30 are composed of a first group 31 of sensors and a second group 32 of sensors. In the present embodiment, each of the first group 31 of sensors and the second group 32 of sensors is also composed of a plurality of elongated sensors 30.

In the first group 31 of sensors, the sensors 30 are uniformly arranged around the through hole 16 in the circumferential direction such that the longer-length direction thereof (the sensitive direction of the sensors 30 in the present embodiment is set to be the longer-length direction) extends along the circumferential direction. To arrange the sensors 30 such that the longer-length direction of the sensors 30 extends along the circumferential direction means to arrange the sensors 30 such that the longer-length direction of the sensors 30 is parallel to a tangent to the outer edge of the through hole 16. In the present embodiment, the first group 31 of sensors include fours sensors 30. These four sensors 30 are arranged around the through hole 16 uniformly, or in other words, at positions shifted at intervals of 90 degrees with the axis of the disk portion 15 as the rotational axis.

Thereby, the inner ring portion 18 is displaced downward when external force acts on the load input portion 20. At this time, tensile force acts on the inner ring portion 18 along the circumferential direction of the through hole 16. Thus, the first group 31 of sensors mainly detect tensile strain.

The second group 32 of sensors are uniformly arranged around the through hole 16 in the circumferential direction such that the longer-length direction thereof extends along the radial direction. To arrange the sensors 30 such that the longer-length direction thereof extends along the radial direction means to arrange the sensors 30 such that the longer-length direction thereof coincides with the radial direction of the disk portion 15. In the present embodiment, the second group 32 of sensors include four sensors 30. These four sensors 30 are arranged around the through hole 16 uniformly, or in other words, at positions shifted at intervals of 90 degrees with the axis of the disk portion 15 as the rotational axis.

Thereby, the inner ring portion 18 is displaced downward when external force acts on the load input portion 20. At this time, bending occurs in the outer ring portion 17, and compressive force acts on the back surface of the outer ring portion 17. Thus, the second group 32 of sensors mainly detect compressive strain.

The first group 31 of sensors and the second group 32 of sensors as described above are provided such that the first group 31 of sensors are located on the radially inner side of the second group 32 of sensors. Further, in the present embodiment, the first group 31 of sensors and the second group 32 of sensors are arranged at positions shifted in the circumferential direction. That is, as shown in FIG. 2, in the first group 31 of sensors and the second group 32 of sensors, the sensors 30 that constitute the first group 31 of sensors and whose longer-length direction extends along the circumferential direction and the sensors 30 that constitute the second group 32 of sensors and whose longer-length direction extends along the radial direction are arranged alternately in the circumferential direction at positions shifted at intervals of 45 degrees with the axis of the disk portion 15 as the rotational axis.

Figure 3:
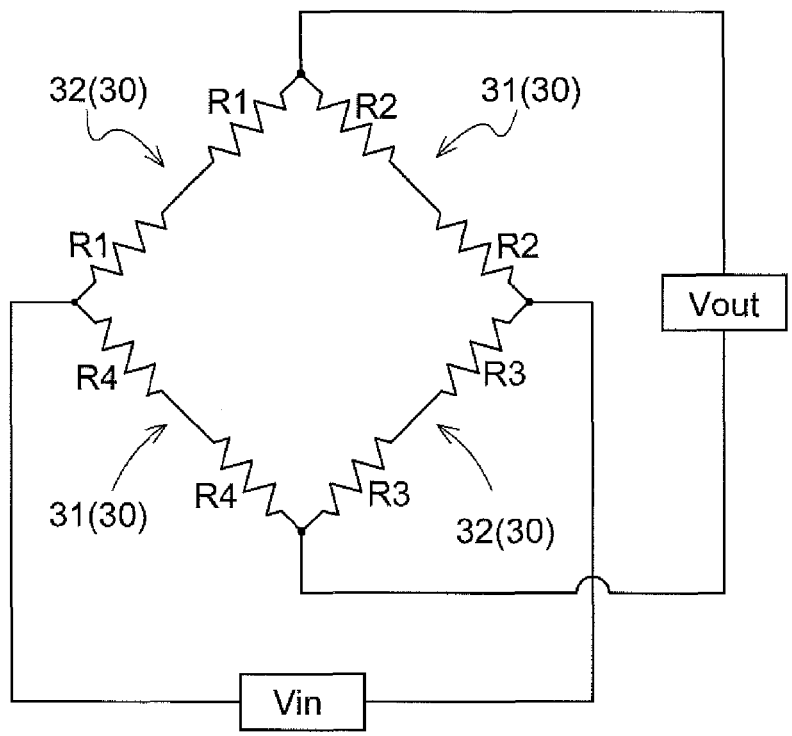
FIG. 3 is a circuit diagram showing a configuration of connection of sensors.

In the present embodiment, the sensors 30 are formed by using known strain detection elements. In the present embodiment, of four strain detection elements constituting each of the first group 31 of sensors and the second group 32 of sensors, two strain detection elements facing each other in the radial direction are connected in series to form a Wheatstone bridge circuit as shown in FIG. 3. The Wheatstone bridge circuit is configured to increase its resistance value when tensile force acts on the strain detection elements, and decreases its resistance value when compressive force acts on the strain detection elements. The load is detected by determining such a change in resistance value by a change in voltage or current. Since such a strain detection element and a Wheatstone bridge circuit are known, the description thereof has been omitted.

By configuring the load detection device 100 in this manner, when a load is applied to the load input portion 20, it is possible to generate compressive strain in the first group 31 of sensors, and tensile strain in the second group 32 of sensors. Accordingly, it is possible to detect a load with good sensitivity.

Figure 4:
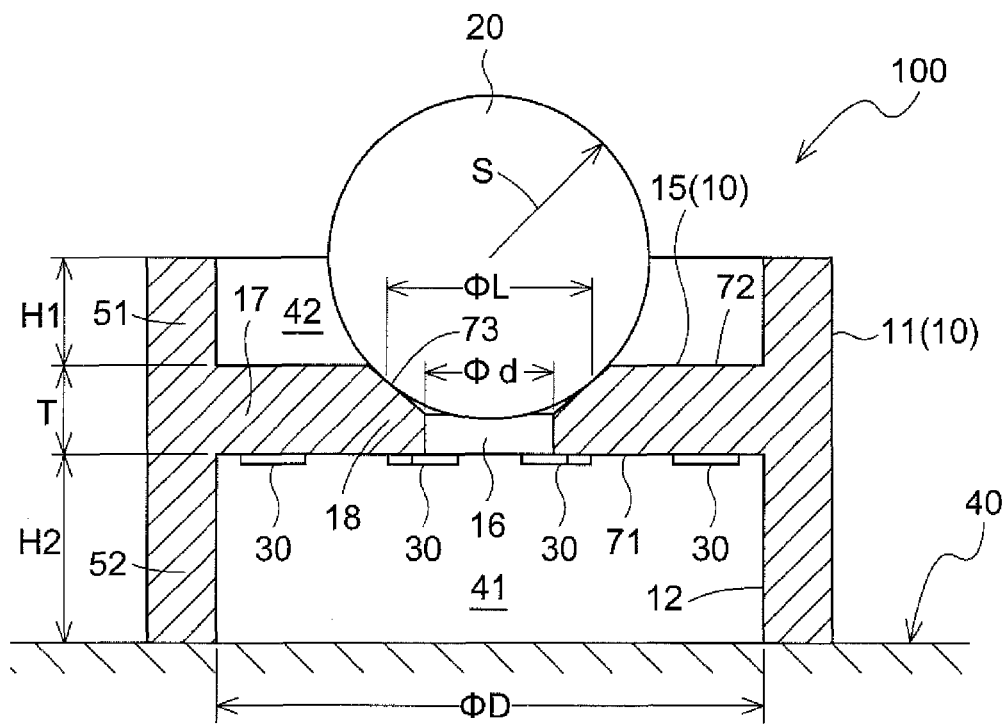
FIG. 4 is a diagram showing the dimensional setting of various portions of a strain generating member according to the first embodiment.

Next, the dimensional setting of various parts of the strain generating member 10 will be described with reference to FIG. 4. As shown in FIG. 4, the load input portion 20 is configured as a spherical shape having a sphere radius S, the inside diameter of the through hole 16 is φd, and the outside diameter of the disk portion 15, or in other words, the inside diameter of the peripheral wall portion 11 is φD. In addition, the thickness of the outer ring portion 17 of the disk portion 15 is T. The axial length from the surface 71 of the disk portion 15 to one axial end of the peripheral wall portion 11 on the placement surface 40 side (the axial length of the second peripheral wall portion 52) is H2. The axial length from the surface 72 of the disk portion 15 to the other axial end of the peripheral wall portion 11 (the axial length of the first peripheral wall portion 51) is H1.

Figure 5:
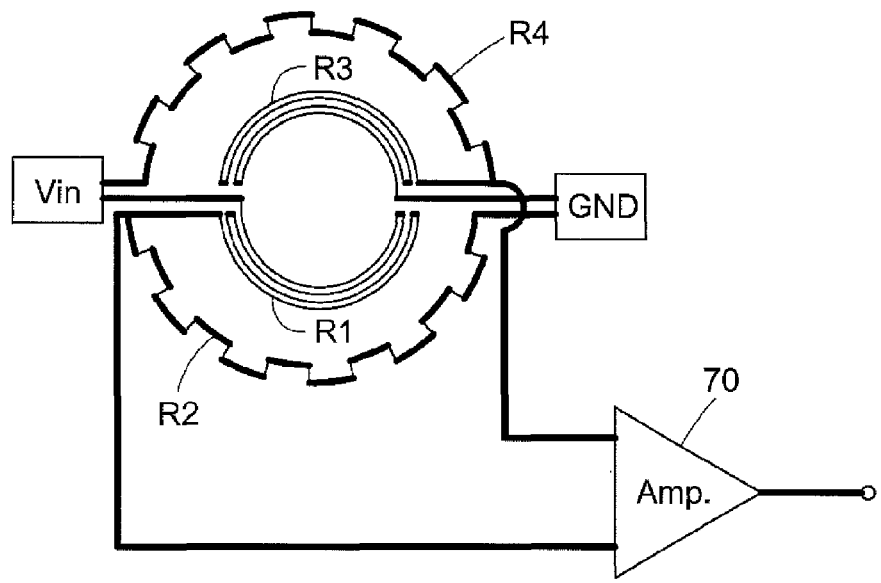
FIG. 5 is a circuit diagram showing a configuration of connection of sensors used for setting parameters of the strain generating member according to the first embodiment.

The sensors 30 are provided on the surface 71 of the disk portion 15. In the example shown in FIG. 5, the first group 31 of sensors are composed of the sensors 30 having resistance values R1 and R3, and detect a strain generated in the circumferential direction. The second group 32 of sensors are composed of the sensors 30 having resistance values R2 and R4, and detect a strain generated in the radial direction. These sensors 30 constitute a bridge circuit as shown in FIG. 5. When compressive strain and tensile strain are generated in a sensor 30, the sensor 30 change its resistance value in response to tensile strain and compressive strain, and an output voltage corresponding to the change is output from an amplifier (Amp.) 70.

In this case as well, the sensors 30 are arranged point-symmetrically (rotation-symmetrically) about the axis of the peripheral wall portion 11 and connected uniformly on the four sides of the bridge circuit. Thereby, it is possible to avoid an inclusion of a load detection error due to an influence of an imbalance in strain generated in the strain generating member 10 by tilt of the load.

Figure 6:
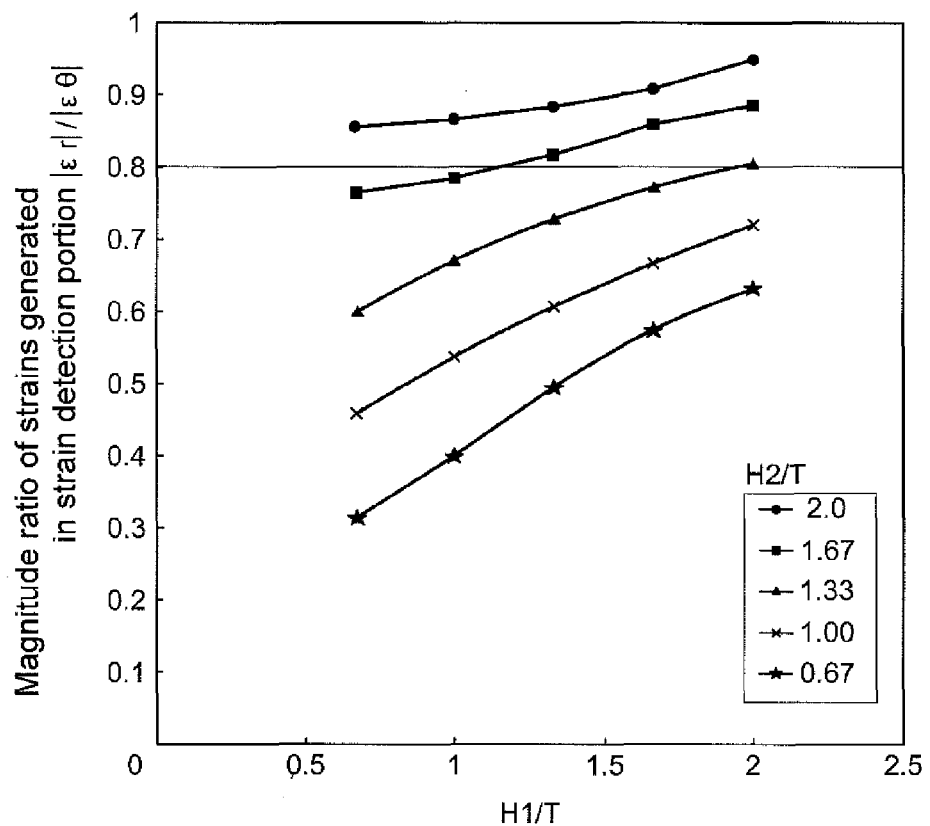
FIG. 6 is a graph showing the characteristic of the parameter setting of a peripheral wall portion according to the first embodiment.

Here, a strain generating member 10 is configured such that S=50 mm, $\phi D$=40 mm, T=3 mm, and $\phi d$=17 mm. Then, examination was conducted on the influence on the magnitude ratio of the strains generated in the sensors 30 when H1 and H2 were varied. The results are shown in FIG. 6. In FIG. 6, the horizontal axis represents the ratio H1/T, and the vertical axis represents the ratio between the strain generated in the radial direction $\epsilon r$ and the strain generated in the circumferential direction $\epsilon \theta$. Note that the reference signs such as S, $\phi D$, T, and $\phi d$ in FIG. 4 are given to facilitate the understanding, and are not intended to depict the above-described sizes.

As shown in FIG. 6, it was found that as H1 and H2 are increased relative to the thickness T of the disk portion 15, the ratio between the strain generated in the radial direction $\epsilon r$ and the strain generated in the circumferential direction $\epsilon \theta$ increases. Here, the sensitivity of the load detection device 100 increases as the ratio between the strain generated in the radial direction $\epsilon r$ and the strain generated in the circumferential direction $\epsilon \theta$ approaches 1. It was found that when the ratio between the strain generated in the radial direction $\epsilon r$ and the strain generated in the circumferential direction $\epsilon \theta$ is 0.8, for example, as the standard for a highly sensitive load detection device 100, it is preferable that the ratio H1/T is 0.6 or more and the ratio H2/T is 1.3 or more.

Figure 7:
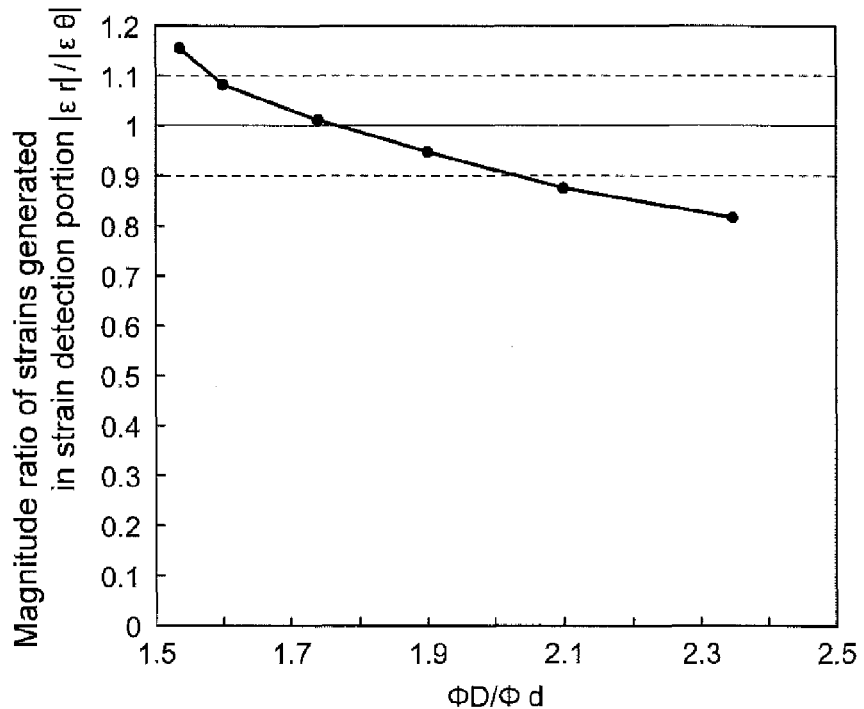
FIG. 7 is a graph showing the characteristic of the parameter setting of a disk portion according to the first embodiment.

Next, a strain generating member 10 is configured such that S=50 mm, $\phi D$=40 mm, T=3 mm, H1=4 mm, and H2=5 mm. Then, examination was conducted on the influence on the magnitude ratio of the strains generated in the sensors 30 when $\phi d$ was varied. The results are shown in FIG. 7. In FIG. 7, the horizontal axis represents the ratio $\phi D/\phi d$, and the vertical axis represents the ratio between the strain generated in the radial direction $\epsilon r$ and the strain generated in the circumferential direction $\epsilon \theta$.

As shown in FIG. 7, it was found that as the $\phi D/\phi d$ ratio is increased, the ratio between the strain generated in the radial direction $\epsilon r$ and the strain generated in the circumferential direction $\epsilon \theta$ decreases. That is, it was found that the sensitivity of the load detection device 100 can be adjusted by adjusting the ratio $\phi D/\phi d$. Here, as described above, the sensitivity of the load detection device 100 increases as the ratio between the strain generated in the radial direction $\epsilon r$ and the strain generated in the circumferential direction $\epsilon \theta$ approaches 1. It was found that when the ratio between the strain generated in the radial direction $\epsilon r$ and the strain generated in the circumferential direction $\epsilon \theta$ is 0.9 or more and 1.1 or less, for example, as the standard for a highly sensitive load detection device 100, it is preferable that the ratio $\phi D/\phi d$ is about 1.6 to 2.1.

Figure 8:
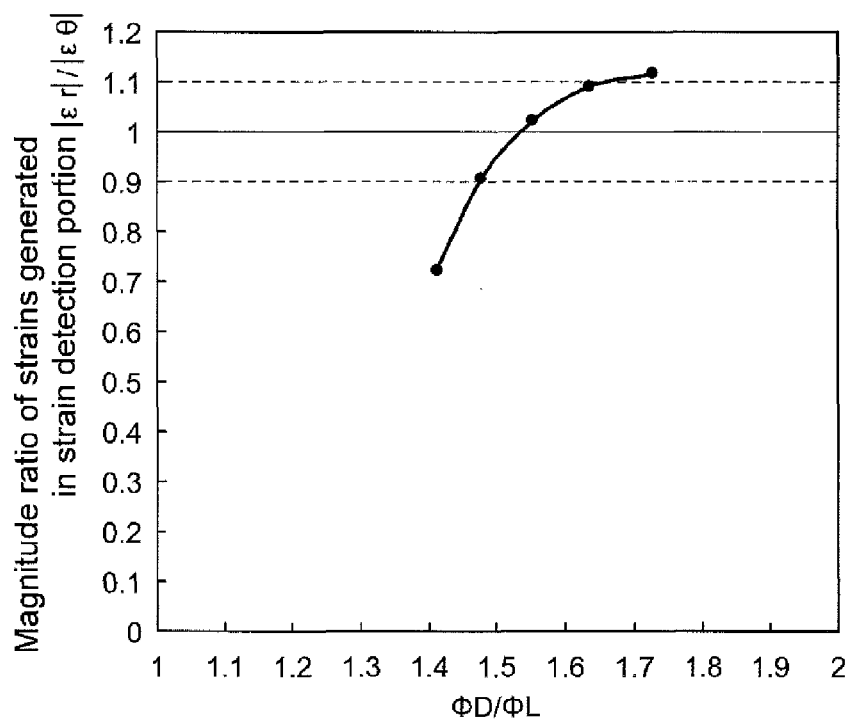
FIG. 8 is a graph showing the characteristic of the parameter setting of a contact diameter according to the first embodiment.

Next, a strain generating member 10 is configured such that $\phi D$=40 mm, T=3 mm, H1=4 mm, H2=5 mm, and $\phi d$=21 mm. Then, examination was conducted on the influence on the magnitude ratio of the strains generated in the sensors 30 when the contact diameter $\phi L$ with which the load input portion 20 and the disk portion 15 come into annular contact with each other is changed by changing the sphere radius S of the load input portion 20. The results are shown in FIG. 8. In FIG. 8, the horizontal axis represents the ratio $\phi D/\phi L$, and the vertical axis represents the ratio between the strain generated in the radial direction $\epsilon r$ and the strain generated in the circumferential direction $\epsilon \theta$.

As shown in FIG. 8, it was found that as the ratio $\phi D/\phi L$ is increased, the ratio between the strain generated in the radial direction $\epsilon r$ and the strain generated in the circumferential direction $\epsilon \theta$ increases. That is, it was found that the sensitivity of the load detection device 100 can be adjusted by adjusting the ratio $\phi D/\phi L$. Here, as described above, the sensitivity of the load detection device 100 increases as the ratio between the strain generated in the radial direction $\epsilon r$ and the strain generated in the circumferential direction $\epsilon \theta$ approaches 1. It was found that when the ratio between the strain generated in the radial direction $\epsilon r$ and the strain generated in the circumferential direction $\epsilon \theta$ is, for example, 0.9 or more and 1.1 or less as the standard for a highly sensitive load detection device 100, it is preferable that the $\phi D/\phi L$ ratio is about 1.45 to 1.7. That is, the sensitivity is high when the contact diameter $\phi L$ is on the slightly outer side than the through hole 16. In addition, the sensors 30 arranged in the area around the through hole 16 are difficult to be arranged along the through hole 16 for the convenience of the installation, and are arranged on the slightly outer side than the through hole 16. Accordingly, it was found that the sensitivity is high when the distance between the contact diameter $\phi L$ and the sensors 30 disposed in the area around the through hole 16 is short.

Thus, with the load detection device 100 according to the present embodiment, the disk portion 15 is elevated from the placement surface 40, and it is therefore possible to cause the disk portion 15 to be easily strained according to the load input to the load input portion 20. This makes it possible to suppress the load input to the load input portion 20 from being damped, while transmitting that load to the sensors 30 provided on the disk portion 15. Therefore, it is possible to increase the detection sensitivity. Furthermore, since the sensors 30 are provided point-symmetrically about the through hole 16, it is possible to detect the load input to the load input portion 20 regardless of the direction thereof.

2. Second Embodiment

Next, a load detection device according to a second embodiment will be described. The load detection device according to the present embodiment is configured to appropriately detect a load input from the outside even with low profile specifications in which the product height is reduced. In the following, a load detection device according to the present embodiment will be described with reference to the drawings.

Figure 9:
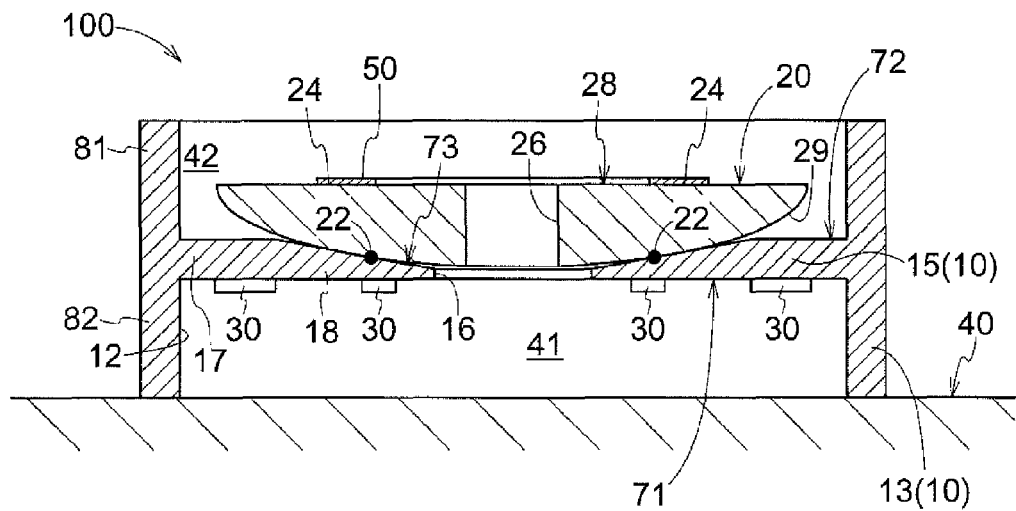
FIG. 9 is a diagram schematically showing a side cross-section of a load detection device according to a second embodiment.
Figure 10:
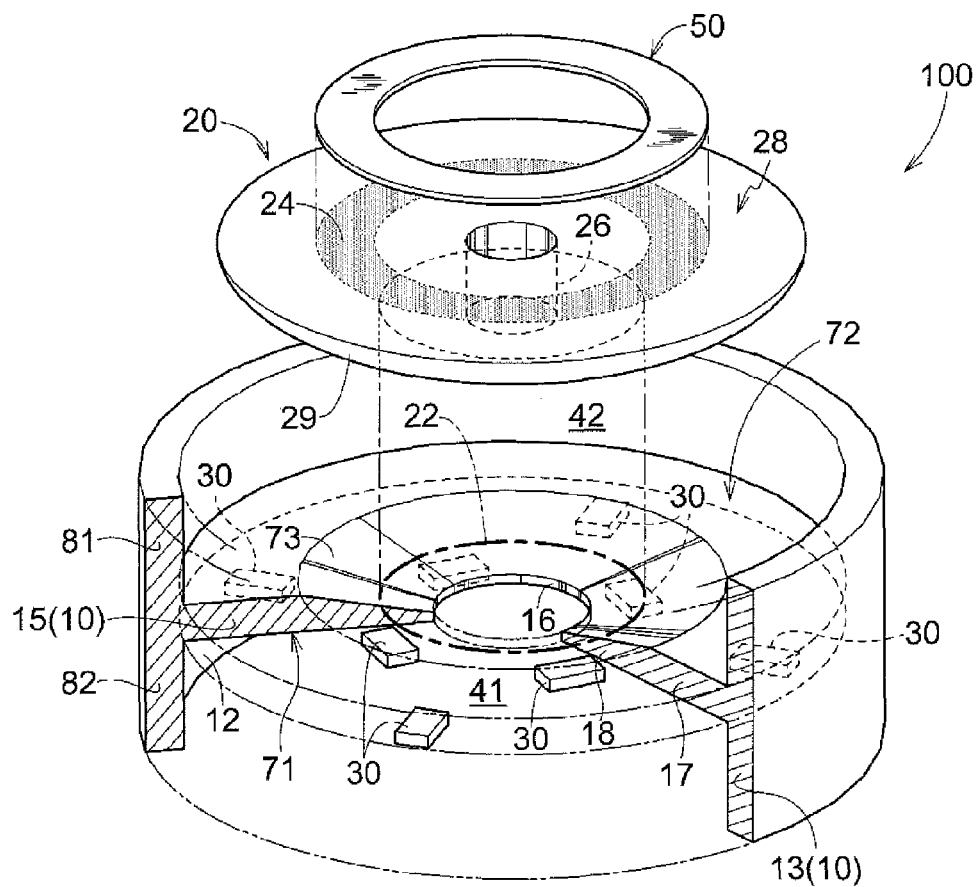
FIG. 10 is an exploded perspective view schematically showing the load detection device according to the second embodiment.
Figure 11:
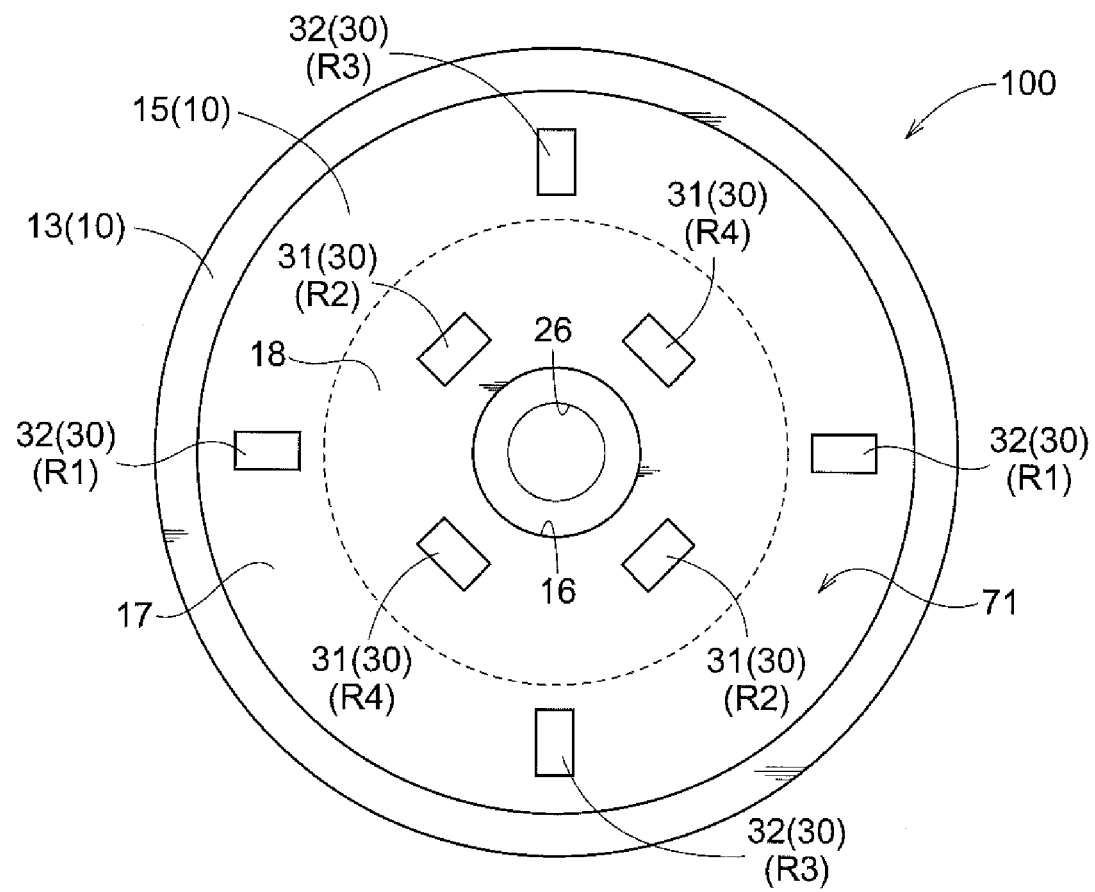
FIG. 11 is a diagram of the load detection device according to the second embodiment, as viewed from below.

FIG. 9 shows a side cross-sectional view of a load detection device 100 according to the present embodiment. FIG. 10 shows an exploded perspective view, partly in cross section, of the load detection device 100. FIG. 11 shows a schematic diagram of the load detection device 100 as viewed from below. As shown in FIGS. 9 and 10, the load detection device 100 includes a strain generating member 10, a load input portion 20, and sensors 30. The strain generating member 10 includes a support member 13 and a disk portion 15.

In the present embodiment, the support member 13 corresponds to the peripheral wall portion 11 of the first embodiment. The support member 13 has a tubular shape, and is formed in a cylindrical shape. In other words, the support member 13 is formed in a tubular shape whose cross section orthogonal to the axial direction is circular.

The load input portion 20 includes an input surface 24 to which the load from an object to be detected is input and a curved output surface 29 formed on the side opposite to the input surface 24, and the load is output from the output surface 29. In the present embodiment, the load input portion 20 is formed in, for example, a shape of an object with a smaller volume of the two objects obtained by cutting a sphere at a position displaced from the center, or a shape of an object with a smaller volume of the two objects obtained by cutting an ellipsoidal sphere parallel to the major axis at a position displaced from the center. Accordingly, the load input portion 20 is configured to be flat in side view, as shown in FIG. 9. The input surface 24 is provided on a surface produced at the time of performing the above-described cutting. On the other hand, the output surface 29 is provided on a curved surface that has been present before the cutting. At least a portion of the output surface 29 is configured to come into contact with the disk portion 15, which will be described later, and a load that is input to the input surface 24 is output to the disk portion 15.

In the present embodiment, the load input portion 20 is provided with a hole portion 26 axially extending therethrough. Accordingly, the load input portion 20 is configured in a disk shape in top view. As shown in FIGS. 9 and 10, the load input portion 20 is configured to have an outside diameter smaller than the inside diameter of the support member 13. Accordingly, the load input portion 20 is configured to be accommodated in the space 42.

The disk portion 15 is formed in a disk shape, and includes a contact portion 22 coming into contact with the curved surface of the load input portion 20 along a continuous circular line or a broken circular line centered on the center of the load input portion 20. The disk portion 15 of the present embodiment is similar to the disk portion 15 of the first embodiment, and therefore, the description thereof has been omitted. Note that in the present embodiment, the first peripheral wall portion 51 according to the first embodiment corresponds to a first support member 81, and the second peripheral wall portion 52 according to the first embodiment corresponds to a second support member 82. Accordingly, a space 41 is formed by the second support member 82, the disk portion 15, and the placement surface 40. On the other hand, a space 42 is formed by an axial end face of the first support member 81, the first support member 81, and the disk portion 15.

Further, the disk portion 15 includes an outer ring portion 17 and an inner ring portion 18, as with the first embodiment. FIG. 11 shows a diagram of the disk portion 15 as viewed from below. The disk portion 15 is configured to have a tapered portion 73 on the radially central side thereof (see FIGS. 9 and 10). In the present embodiment, the load input portion 20 is placed on such a tapered portion 73. Accordingly, the load input portion 20 can come into annular line contact with the tapered portion 73, without passing through the through hole 16. The portion coming into such line contact corresponds to the contact portion 22. In FIG. 10, the contact portion 22 is indicated by the dashed dotted line.

As described above, the load input portion 20 according to the present embodiment is provided with the hole portion 26 axially extending through the load input portion 20. The load input portion 20 is placed on the disk portion 15 such that the axis of the hole portion 26 is coaxial with the axis of the through hole 16.

As shown in FIG. 11, in the present embodiment as well, the sensors 30 are arranged on the disk portion 15 so as to be point-symmetric about the through hole 16 when the disk portion 15 is viewed in the axial direction. This configuration is similar to that of the first embodiment, and therefore, the description thereof has been omitted.

Here, for the load input portion 20 of the load detection device 100 of the present embodiment, the diameter range of the input surface 24 is set based on the diameter of the contact portion 22 that changes in response to a deflection of the disk portion 15 that results from input of the load. The disk portion 15 is deflected according to the load input to the load input portion 20. The diameter of the contact portion 22 is changed by this deflection. The input surface 24 is formed in an annular shape on a surface 28 of the load input portion 20. The load of the object to be detected described above is input to the input surface 24. Accordingly, in the load detection device 100 according to the present embodiment, the load of the object to be detected is input annularly.

Here, the load input to the load input portion 20 is transmitted via the contact portion 22 to the disk portion 15, and causes the disk portion 15 to be deflected. The sensors 30 are strained by this deflection, and the load is detected. Accordingly, to appropriately detect the load input to the load input portion 20, the load needs to be transmitted to the contact portion 22 without being damped.

Figure 12:
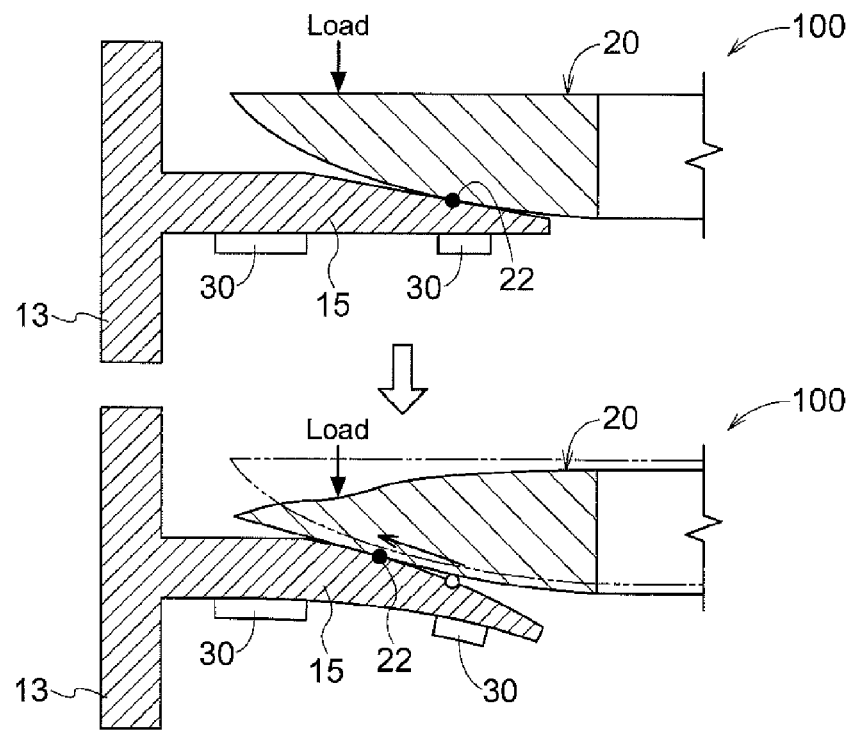
FIG. 12 is a diagram showing a configuration when a load is input on a radially outer side than a contact portion in the second embodiment.

In the following, before the description of the setting of the input surface 24, the relationship between the position at which a load is input to the load input portion 20 and the contact portion 22 will be described. First, let us consider an example in which a load is input to the load input portion 20 at a position on the radially outer side than the contact portion 22 before the load is input thereto when the load detection device 100 is viewed from the side, as shown in the upper section in FIG. 12. In this case, as shown in the lower section in FIG. 12, a part of the disk portion 15 that is located on the radially outer side than the contact portion 22 is deflected in the input direction of the load (downward on the sheet of paper) according to the load input to the disk portion 15, so that the contact portion 22 is moved radially outward. Accordingly, the diameter of the contact portion 22 is expanded. Note that in the lower section in FIG. 12, the position of the contact portion 22 before being moved (the same state as in the upper section in FIG. 12) is indicated by the open circle and the position of the contact portion 22 after being moved is indicated by the filled circle.

Figure 13:
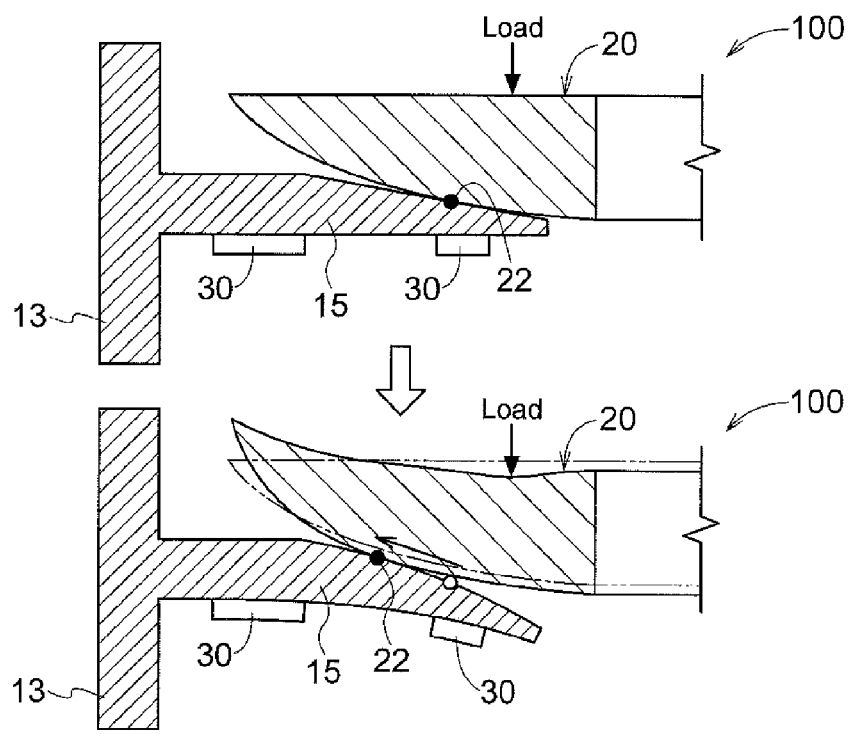
FIG. 13 is a diagram showing a configuration when a load is input on a radially inner side than the contact portion in the second embodiment.

As shown in the upper section in FIG. 13, also in the case where a load is input to the load input portion 20 at a position on the radially inner side than the contact portion 22 before the load is input thereto when the load detection device 100 is viewed from the side, a part of the disk portion 15 that is on the radially outer side than the contact portion 22 is deflected to the direction from which the load is input (upward on the sheet of paper) in response to the input load, as shown in the lower section in FIG. 13, so that the contact portion 22 is moved slightly radially outward. Accordingly, the diameter of the contact portion 22 is expanded in this case as well. Thus, although the form of deflection of the disk portion 15 differs depending on the relationship between the contact portion 22 and the position to which the load is input, the position of the contact portion 22 at the time of input of the load is moved radially outward in either case.

For the load detection device 100 of the present embodiment, the input surface 24 is set as described above. The input surface 24 is set based on a maximum change amount along the radial direction of the contact portion 22 that changes in response to a deflection of the disk portion 15 that results from input of the load. As described above, the diameter of the contact portion 22 is increased (expanded) in response to input of the load. The maximum amount of change along the radial direction refers to the amount of change by which the diameter of the contact portion 22 is most significantly changed when a load that can be detected by the load detection device 100 is input.

Figure 14:
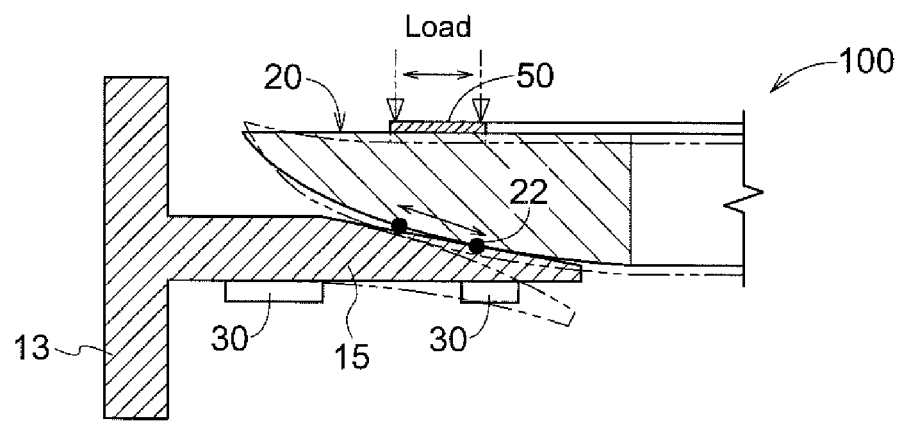
FIG. 14 is a diagram showing the relationship between the center of input of a load and a contact portion according to the second embodiment.

More specifically, it is preferable that the input surface 24 is set in a region that overlaps the contact portion 22 as viewed along the axial direction even when the diameter of the contact portion 22 is changed as a result of a deflection of the disk portion 15. That is, it is preferable that the input surface 24 is set such that the contact portion 22 overlaps the input surface 24 in the axial direction when the load detection device 100 is viewed along the axial direction, regardless of whether or not a load is input. To achieve this configuration, the input surface 24 is configured to have a predetermined width in the radial direction. The predetermined width is set such that the input position of the load and the contact portion 22 always overlap in the axial direction even if the contact portion 22 is moved radially outward as the load is input. Thereby, as shown in FIG. 14, the center of input of the load is also moved radially outward when the contact portion 22 is moved radially outward as a result of input of the load. Accordingly, it is possible to constantly make the center of input of the load and the contact portion 22 coincide with each other in the axial direction via the load input portion 20, and therefore, the bending moment acting on the load input portion 20 at the time of input of the load can be reduced. Therefore, the bending stress resulting from the positional displacement between the load input to the load input portion 20 and the contact portion 22 can be constantly zero. Thus, it is possible to configure a highly reliable and durable load input portion 20 without using a material having strength against bending force or an inexpensive material having high durability against repeated bending (high reliability and durability).

It is preferable that a ring-shaped intermediate pressing member 50 is placed on such an input surface 24. As described above, the input surface 24 is configured in an annular shape. It is preferable that an intermediate pressing member 50 is placed on such an annular input surface 24. Thereby, the contact portion 22 can be configured to overlap the input position of the load in the axial direction even if the position of the contact portion 22 is moved radially outward.

Note that with the load detection device 100 according to the present embodiment, the reliability and durability of the load input portion 20 can be increased by using an inexpensive material having low strength or low durability (reliability and durability) against repeated bending. Therefore, it is possible to achieve a highly durable load detection device 100 at a low cost without a cost increase.

3. Other Embodiments

In the first embodiment, the load input portion 20 is illustrated as being spherical. However, the scope of the present invention is not limited thereto. Only the side of the load input portion 20 that faces the disk portion 15 may be spherical, and the shape of the side of the disk portion 15 that does not face the disk portion 15 may not be spherical. In other words, the load input portion 20 may be semi-spherical.

In the above embodiments, the sensors 30 are described as being provided on the surface 71 of the disk portion 15. However, the scope of the present invention is not limited thereto. That is, it is naturally possible to adopt a configuration in which the sensors 30 are provided on the surface 72 of the disk portion 15. Also, it is naturally possible to adopt a configuration in which the first group 31 of sensors are provided on the surface 71, and the second group 32 of sensors are provided on the surface 72.

In the above embodiments, the sensors 30 are described as being composed of the first group 31 of sensors and the second group 32 of sensors. However, the scope of the present invention is not limited thereto. It is naturally possible that the sensors 30 are constituted by one of the first group 31 of sensors and the second group 32 of sensors.

In the above embodiments, the first group 31 of sensors are described as being provided radially inward of the second group 32 of sensors. However, the scope of the present invention is not limited thereto. It is possible to provide the first group 31 of sensors and the second group 32 of sensors such that their radial positions are the same. Alternatively, it is naturally possible to configure the first group 31 of sensors so as to be disposed radially outward of the second group 32 of sensors.

In the above embodiments, the first group 31 of sensors and the second group 32 of sensors are illustrated as being provided in mutually alternate circumferential positions. However, the scope of the present invention is not limited thereto. It is naturally possible to provide the first group 31 of sensors and the second group 32 of sensors such that the radial positions of their respective sensors 30 coincide.

In the above embodiments, the first group 31 of sensors and the second group 32 of sensors are each illustrated as being composed of four sensors 30. However, the scope of the present invention is not limited thereto. It is possible that the first group 31 of sensors and the second group 32 of sensors are each composed of a number of sensors 30 other than four, and it is naturally possible that the first group 31 of sensors and the second group 32 of sensors are composed of different numbers of sensors 30.

In the above embodiments, the inner ring portion 18 of the disk portion 15 is described as being formed such that its thickness decreases toward the radially inner side. However, the scope of the present invention is not limited thereto. It is naturally also possible to configure the inner ring portion 18 to have a uniform thickness as with the outer ring portion 17.

In the first embodiment, the disk portion 15 is described as being supported on the axially central side of the peripheral wall portion 11. However, the scope of the present invention is not limited thereto. It is naturally possible to configure the disk portion 15 so as to be supported at an axial end of the peripheral wall portion 11 on the side opposite to the side on which the placement surface 40 is installed.

Figure 15:
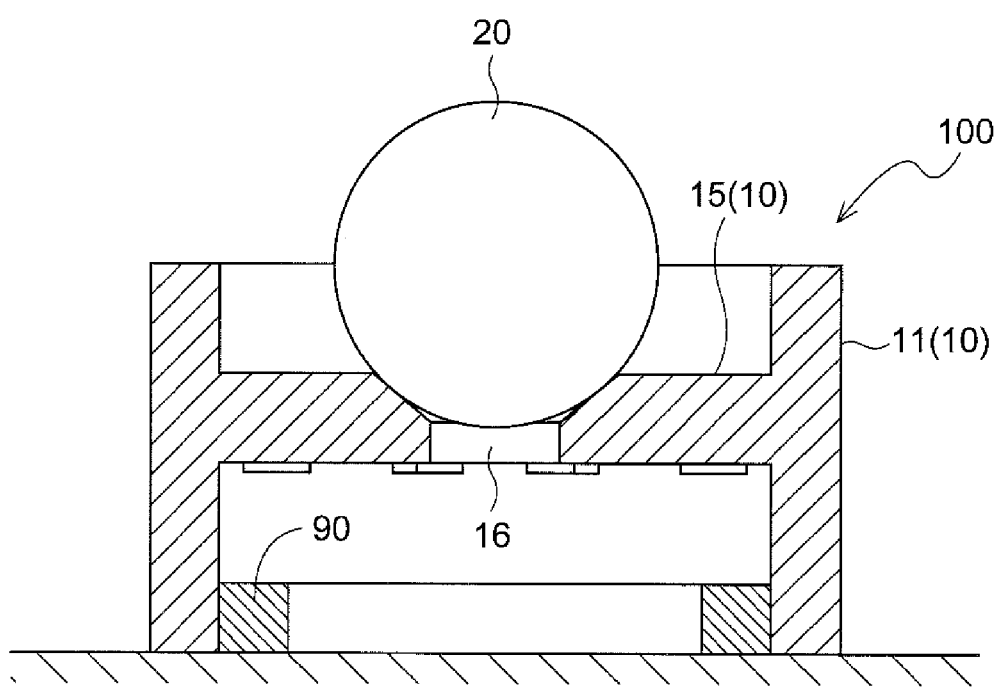
FIG. 15 is a diagram schematically showing a stopper according to another embodiment.
Figure 16:
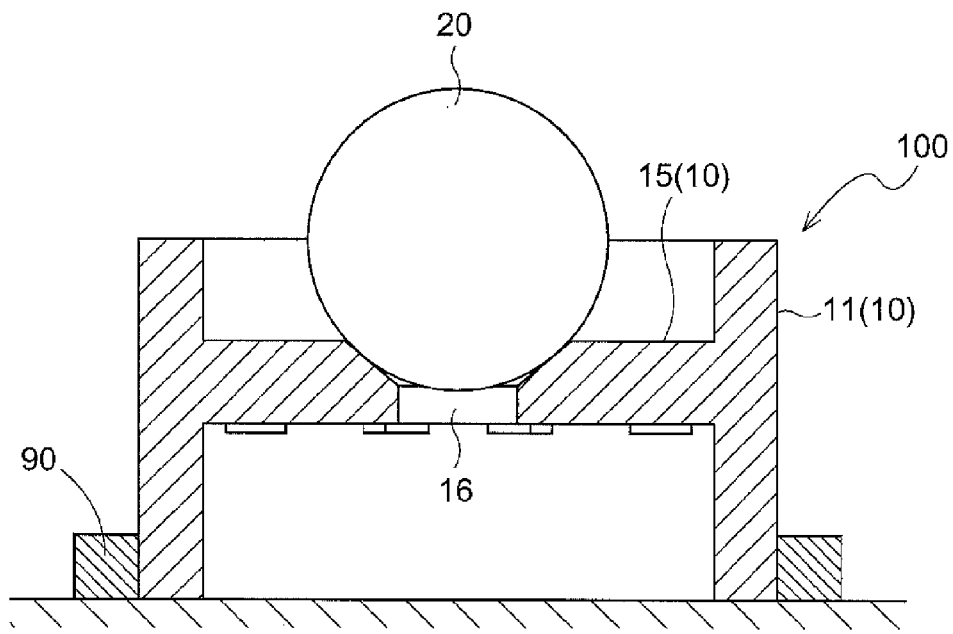
FIG. 16 is a diagram schematically showing a stopper according to another embodiment.

In the first embodiment, the load detection device 100 is described as being placed on the placement surface 40. For example, in order to facilitate the transmission of the strain corresponding to a load to the peripheral wall portion 11 when the load is input to the load input portion 20 from obliquely above, it is preferable that a stopper 90 that restricts the movement of the peripheral wall portion 11 in a direction parallel to the placement surface 40 is attached to the placement surface 40. It is preferable that such a stopper 90 is constituted by an annular protrusion having an outside diameter equal to the inside diameter of the peripheral wall portion 11, for example, as shown in FIG. 15. Alternatively, as shown in FIG. 16, the stopper 90 can be constituted by an annular protrusion having an inside diameter equal to the outside diameter of the peripheral wall portion 11. It is not necessary to increase the height of such a stopper 90 in order to restrict the lateral movement of the peripheral wall portion 11 and not to prevent the peripheral wall portion 11 from being strained. Of course, it is possible to adopt a configuration in which the stopper 90 is constituted by an annular recess rather than the annular protrusion, and the peripheral wall portion 11 is disposed so as to be fitted in the recess. Alternatively, the stopper 90 can be constituted by a plurality of protrusions that are discontinuous in the circumferential direction.

In the first embodiment, the peripheral wall portion 11 is described as being cylindrical. However, the scope of the present invention is not limited thereto. The peripheral wall portion 11 may be polygonal. In such a case, it is preferable that a part of the outer circumference of the disk portion 15 is spaced apart from the inner surface of the peripheral wall portion 11 so as to facilitate the straining of the disk portion 15 by the load input to the load input portion 20. That is, it is preferable that the disk portion 15 does not come into contact with the corners of the inner surface of the peripheral wall portion 11. Furthermore, the disk portion 15 can be configured in a polygonal shape, for example. That is, the cross section of the disk portion 15 in axial view can be configured in a hexagonal or octagonal shape, thereby preventing the corners of the inner surface of the peripheral wall portion 11 and the disk portion 15 from coming into contact with each other.

In the above embodiments, the sensors 30 are described as being uniformly arranged around the through hole 16 in the circumferential direction such that the longer-length direction thereof extends along the circumferential direction. However, the scope of the present invention is not limited thereto. That is, when the sensitive direction of the sensors 30 is the shorter-length direction, it is naturally possible that the sensors 30 are uniformly arranged around the through hole 16 in the circumferential direction such that the shorter-length direction thereof extends along the circumferential direction.

In the second embodiment, the contact portion 22 is described as coming into contact with the disk portion 15 in the form of a line extending continuously along the circumferential direction. However, the scope of the present invention is not limited thereto. For example, it is possible that the contact portion 22 comes into contact in the form of a line extending discontinuously along the circumferential direction. Alternatively, it is possible that the contact portion 22 comes into point contact.

In the second embodiment, the input surface 24 is described as being set based on the maximum change amount along the radial direction of the contact portion 22 that changes in response to a deflection of the disk portion 15 as a result of input of the load. However, the scope of the present invention is not limited thereto. It is naturally possible to set the input surface 24 without taking the maxim change amount of the contact portion 22 into consideration.

In the second embodiment, the ring-shaped intermediate pressing member 50 is described as being placed on the input surface 24. However, the scope of the present invention is not limited thereto. That is, it is naturally possible that the intermediate pressing member 50 is not provided.

In the second embodiment, the surface on which the intermediate pressing member 50 and the load input portion 20 come into contact with each other is illustrated as a flat surface in FIG. 9. However, the scope of the present invention is not limited thereto. It is also possible that at least one of the cross section, perpendicular to the circumferential direction, of the surface of the intermediate pressing member 50 that comes into contact with the load input portion 20, and the cross section, perpendicular to the circumferential direction, of the surface of the load input portion 20 that comes into contact with the intermediate pressing member 50 is constituted by a curved surface. In other words, the surface of the load input portion 20 on which the intermediate pressing member 50 is placed may be a flat surface, and the cross section, perpendicular to the circumferential direction, of the surface of the intermediate pressing member 50 that comes into contact with the load input portion 20 may be a curved surface. Alternatively, the surface of the intermediate pressing member 50 that is placed on the load input portion 20 may be a flat surface, and the cross section, perpendicular to the circumferential direction, of the surface of the load input portion 20 that comes into contact with the intermediate pressing member 50 is a curved surface. Furthermore, it is naturally possible that both the cross section, perpendicular to the circumferential direction, of the surface of the intermediate pressing member 50 that comes into contact with the load input portion 20, and the cross section, perpendicular to the circumferential direction, of the surface of the load input portion 20 that comes into contact with the intermediate pressing member 50 are constituted by a curved surface.

Figure 17:
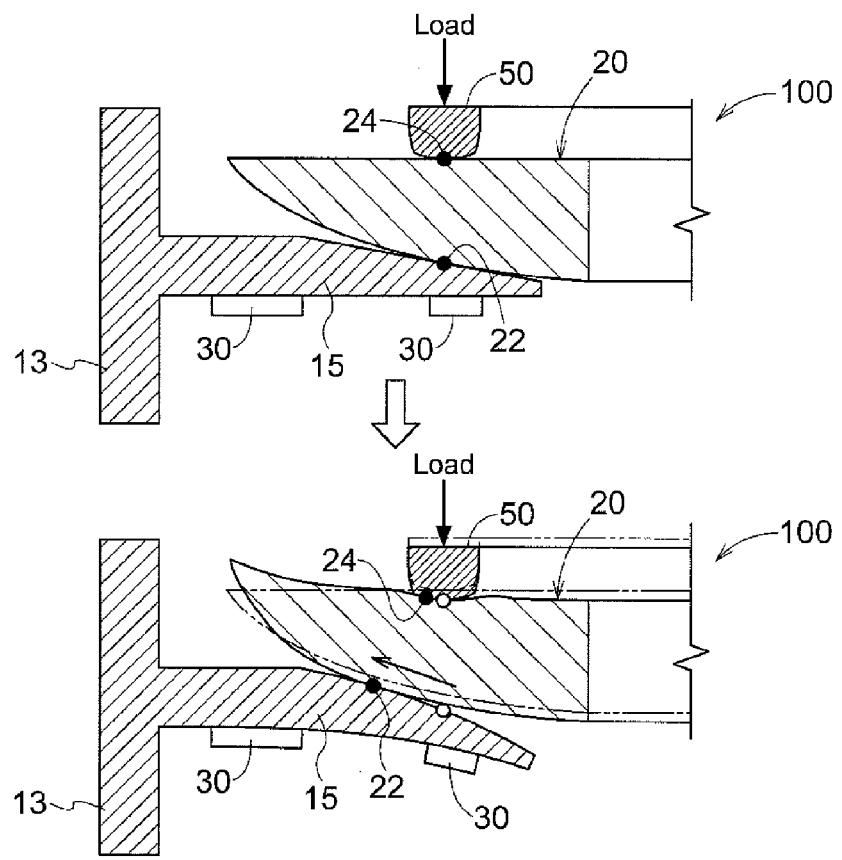
FIG. 17 is a diagram showing an intermediate pressing member according to another embodiment.

FIG. 17 shows a case where the surface of the load input portion 20 on which the intermediate pressing member 50 is placed is a flat surface, and the cross section, perpendicular to circumferential direction, of the surface of the intermediate pressing member 50 that comes into contact with the load input portion 20 is a curved surface as an example of the above-described configurations. The intermediate pressing member 50 is provided above the contact portion 22 in a state in which no load is input thereto. That is, the position at which the intermediate pressing member 50 comes into contact with the load input portion 20 and the position of the contact portion 22 coincide when the load detection device 100 is viewed in the axial direction.

In such a case, when a load is input to the intermediate pressing member 50 as shown in the upper section in FIG. 17, the load input portion 20 sinks in the input direction of the load (downward on the sheet of paper) as shown in the lower section in FIG. 8. Consequently, a part of the load input portion 20 that is located on the radially outer side than the contact portion 22 is deflected to the direction from which the load is input (upward on the sheet of paper). In this case, the contact portion 22 is also moved radially outward along the curved surface of the intermediate pressing member 50, so that the diameter of the contact portion 22 is decreased. On the other hand, the position at which the load is input is also moved slightly radially outward. Accordingly, the contact portion 22 when the load is input thereto and the position at which the load is input can be brought closer to each other when viewed in the axial direction. Thus, it is possible to reduce the bending moment acting on the load input portion 20 when the load is input thereto. Therefore, it is possible to reduce the bending stress due to the positional displacement between the load input to the load input portion 20 and the contact portion 22. Thus, it is possible to achieve a load detection device 100 including a load input portion 20 having high reliability and durability, without using a material having strength against the bending force or an expensive material having excellent reliability and durability.

In the second embodiment, the load input portion 20 is described as being provided with the hole portion 26. However, the scope of the present invention is not limited thereto. It is naturally possible to configure the load input portion 20 without providing the hole portion 26.

In the second embodiment, the support member 13 is described as being cylindrical. However, the scope of the present invention is not limited thereto. It is naturally possible to configure the support member 13 in a shape other than a cylindrical shape.

In the second embodiment, the support member 13 is described as including the first support member 81 and the second support member 82. However, the scope of the present invention is not limited thereto. It is naturally possible to configure the support member 13 without including the first support member 81.

INDUSTRIAL APPLICABILITY

The present invention can be used as a load detection device that detects a load according to a strain of a strain detection element.

DESCRIPTION OF REFERENCE SIGNS

11: peripheral wall portion
12: inner surface
13: support member
15: disk portion
16: through hole
17: outer ring portion
18: inner ring portion
20: load input portion
22: contact portion
24: input surface
29: output surface
30: sensor
31: first group of sensors
32: second group of sensors
40: placement surface
50: intermediate pressing member
90: stopper
100: load detection device

The invention claimed is:
1. A load detection device comprising:
a tubular peripheral wall portion;
a disk-shaped disk portion that has a through hole formed coaxially with the peripheral wall portion and that is supported on an inner surface of the peripheral wall portion with a gap between the disk portion and a placement surface on which the peripheral wall portion is placed;
a load input portion that is formed in a spherical shape having a diameter larger than an inside diameter of the through hole on at least a side thereof facing the through hole, that is placed on the through hole, and to which a load of an object to be detected is input; and
sensors that are provided on a surface of the disk portion opposite to a surface of the disk portion that is in contact with the load input portion so as to be point-symmetric about the through hole, and that detect a strain corresponding to the load input to the load input portion,
wherein the disk portion includes an outer ring portion located on a radially outer side thereof and an inner ring portion located on a radially inner side of the outer ring portion, and the inner ring portion is formed such that a thickness thereof decreases toward the radially inner side,
the load input portion includes an input surface to which the load from the object to be detected is input and a curved output surface formed on a side opposite to the input surface, and the load is output from the output surface,
the disk portion includes a contact portion coming into contact with the curved surface of the load input portion along a continuous circular line or a broken circular line centered on a center of the load input portion,
the peripheral wall portion is a support member that supports the disk portion between the support member and the placement surface, and
a diameter range of the input surface is set based on a diameter of the contact portion that changes in response to a deflection of the disk portion that results from input of the load.
2. The load detection device according to claim 1,
wherein the sensors include a first group of sensors uniformly arranged around the through hole in a circumferential direction such that a sensitive direction thereof extends along the circumferential direction and a second group of sensors uniformly arranged around the through hole in the circumferential direction such that a sensitive direction thereof extends along a radial direction, and
the first group of sensors are provided radially inward of the second group of sensors.
3. The load detection device according to claim 1,
wherein the disk portion is supported on an axially central side of the peripheral wall portion.
4. The load detection device according to claim 1,
wherein a stopper that restricts movement of the peripheral wall portion in a direction parallel to the placement surface is attached to the placement surface.
5. The load detection device according to claim 1,
wherein the input surface is set based on a maximum change amount along the radial direction of the contact portion that changes in response to a deflection of the disk portion that results from input of the load.
6. The load detection device according to claim 1,
wherein the input surface is set in a region that overlaps the contact portion as viewed along an axial direction even when the diameter of the contact portion has changed as a result of a deflection of the disk portion.
7. The load detection device according to claim 1,
wherein a ring-shaped intermediate pressing member is placed on the input surface.
8. The load detection device according to claim 7,
wherein at least one of a cross section, perpendicular to the circumferential direction, of a surface of the intermediate pressing member that comes into contact with the load input portion and a cross section, perpendicular to the circumferential direction, of a surface of the load input portion that comes into contact with the intermediate pressing member is a curved surface.
9. The load detection device according to claim 8,
wherein a surface of the load input portion on which the intermediate pressing member is placed is a flat surface, and the cross section, perpendicular to the circumferential direction, of the surface of the intermediate pressing member that comes into contact with the load input portion is a curved surface.
10. A load detection device comprising:
a tubular peripheral wall portion;
a disk-shaped disk portion that has a through hole formed coaxially with the peripheral wall portion and that is supported on an inner surface of the peripheral wall portion with a gap between the disk portion and a placement surface on which the peripheral wall portion is placed;
a load input portion that is formed in a spherical shape having a diameter larger than an inside diameter of the through hole on at least a side thereof facing the through hole, that is placed on the through hole, and to which a load of an object to be detected is input; and
sensors that are provided on the disk portion so as to be point-symmetric about the through hole, and that detect a strain corresponding to the load input to the load input portion,
wherein the load input portion includes an input surface to which the load from the object to be detected is input and a curved output surface formed on a side opposite to the input surface, and the load is output from the output surface,
the disk portion includes a contact portion coming into contact with the curved surface of the load input portion along a continuous circular line or a broken circular line centered on a center of the load input portion,
the peripheral wall portion is a support member that supports the disk portion between the support member and the placement surface, and
a diameter range of the input surface is set based on a diameter of the contact portion that changes in response to a deflection of the disk portion that results from input of the load.

* * * * *